(12) United States Patent
Ruzicka

(10) Patent No.: US 7,866,085 B1
(45) Date of Patent: Jan. 11, 2011

(54) BOTTOM BOUNCER WITH ADJUSTABLE WEIGHT

(76) Inventor: Emil Ruzicka, 2409 W. Carroll, Oak Creek, WI (US) 53154

(*) Notice: Subject to any disclaimer, the term of this patent is extended or adjusted under 35 U.S.C. 154(b) by 0 days.

(21) Appl. No.: 12/841,479

(22) Filed: Jul. 22, 2010

(51) Int. Cl.
*A01K 95/00* (2006.01)
*A01K 91/00* (2006.01)

(52) U.S. Cl. ............... 43/43.15; 43/43.1; 43/44.87; 43/44.91; 43/44.85

(58) Field of Classification Search ............ 43/43.1, 43/43.15, 44.87, 44.91, 42.74, 44.85, 44.84, 43/44.83
See application file for complete search history.

(56) References Cited

U.S. PATENT DOCUMENTS

| | | | | |
|---|---|---|---|---|
| 754,892 | A * | 3/1904 | Robbins | 43/44.83 |
| 755,683 | A * | 3/1904 | Miller | 43/44.91 |
| 1,352,979 | A * | 9/1920 | Lawrence | 43/42.74 |
| 1,702,417 | A * | 2/1929 | Sandbo | 43/44.85 |
| 1,720,287 | A * | 7/1929 | Moore | 43/44.85 |
| 1,804,084 | A * | 5/1931 | Blake | 43/43.15 |
| 1,840,762 | A * | 1/1932 | Akervick | 43/44.91 |
| 1,870,559 | A * | 8/1932 | Drake | 43/42.22 |
| 1,974,381 | A * | 9/1934 | Swanson et al. | 43/42.74 |
| 1,991,253 | A * | 2/1935 | Kerns | 43/43.15 |
| 2,151,609 | A * | 3/1939 | Menderman | 43/44.91 |
| 2,157,003 | A * | 5/1939 | Mussina | 43/42.74 |
| 2,157,819 | A * | 5/1939 | Eckert | 43/43.15 |
| 2,201,351 | A * | 5/1940 | Skoverski | 43/42.74 |
| 2,289,663 | A * | 7/1942 | Linhares | 43/42.74 |
| 2,399,371 | A * | 4/1946 | Mendelson | 43/43.1 |
| 2,440,989 | A * | 5/1948 | Van Brunt | 43/43.15 |
| 2,482,901 | A * | 9/1949 | Cianfrone | 43/44.85 |
| 2,494,620 | A * | 1/1950 | Johnson | 43/44.85 |
| 2,545,326 | A * | 3/1951 | Westfall et al. | 43/44.85 |
| 2,576,880 | A * | 11/1951 | Jensen | 43/43.15 |
| 2,683,324 | A * | 7/1954 | Engelman | 43/42.74 |
| 2,710,480 | A * | 6/1955 | Gehrig | 43/43.15 |
| 2,759,291 | A * | 8/1956 | Foglio | 43/43.15 |
| 2,770,908 | A * | 11/1956 | Hessert, Jr. | 43/42.74 |
| 2,814,151 | A * | 11/1957 | Knapton | 43/43.15 |
| 2,848,835 | A * | 8/1958 | Witt | 43/42.74 |
| 2,961,793 | A * | 11/1960 | Buchanan | 43/42.74 |
| 3,010,244 | A * | 11/1961 | Mattingly | 43/43.15 |

(Continued)

FOREIGN PATENT DOCUMENTS

DE    3148342 A1 *  6/1983

(Continued)

*Primary Examiner*—Darren W Ark
(74) *Attorney, Agent, or Firm*—Donald J. Ersler

(57) ABSTRACT

A bottom bouncer preferably includes a flexible line, a float and at least one weight. A loop is formed on one end of the flexible line for attachment of a swivel loop or the like. The float includes a lengthwise through hole for receiving the flexible line. The float is preferably retained on the one end of the flexible line. The weight preferably includes a lengthwise through hole for receiving the flexible line. A set screw or the like may be threaded into the weight against the flexible line to secure the weight thereto, such that the loop or swivel loop will be a set distance off the bottom of a body of water. A set screw in a clamp collar may also be tightened on the flexible line to retain the at least one weight on the flexible line. However, other types of fastenable weights may be used.

2 Claims, 4 Drawing Sheets

U.S. PATENT DOCUMENTS

| | | | | |
|---|---|---|---|---|
| 3,084,471 | A * | 4/1963 | Alspaugh | 43/43.14 |
| 3,102,313 | A * | 9/1963 | Arneson | 43/44.83 |
| 3,105,318 | A * | 10/1963 | Birrell | 43/43.15 |
| 3,160,979 | A * | 12/1964 | Bissell | 43/44.85 |
| 3,164,922 | A * | 1/1965 | Kearns et al. | 43/43.15 |
| 3,190,029 | A * | 6/1965 | Bondi | 43/42.74 |
| 3,270,458 | A * | 9/1966 | McAfee | 43/42.74 |
| 3,341,966 | A * | 9/1967 | Pippen | 43/43.15 |
| 3,364,614 | A * | 1/1968 | Huebotter | 43/43.15 |
| 3,468,053 | A * | 9/1969 | Edward | 43/43.1 |
| 3,491,477 | A * | 1/1970 | Karras et al. | 43/44.84 |
| 3,589,052 | A * | 6/1971 | King | 43/44.91 |
| 3,670,447 | A * | 6/1972 | Wohead | 43/43.14 |
| 3,680,246 | A * | 8/1972 | Florek | 43/43.15 |
| 3,744,178 | A * | 7/1973 | Denny | 43/42.74 |
| 3,769,740 | A * | 11/1973 | Lang | 43/44.99 |
| 3,786,595 | A * | 1/1974 | Croce | 43/44.91 |
| 3,897,649 | A * | 8/1975 | Jorgensen | 43/43.15 |
| 3,898,760 | A * | 8/1975 | Klein | 43/44.83 |
| 3,943,652 | A * | 3/1976 | Aunspaugh | 43/42.74 |
| 3,974,591 | A * | 8/1976 | Ray | 43/44.91 |
| 3,991,505 | A * | 11/1976 | Simeti | 43/42.74 |
| 4,428,144 | A * | 1/1984 | Dickinson | 43/42.39 |
| 4,561,206 | A * | 12/1985 | Lowrance et al. | 43/42.74 |
| 4,693,030 | A * | 9/1987 | Wohead | 43/43.1 |
| 4,727,676 | A * | 3/1988 | Runyan | 43/43.1 |
| 4,845,877 | A * | 7/1989 | Koetje | 43/7 |
| 4,858,369 | A * | 8/1989 | Collins | 43/44.87 |
| 5,253,447 | A * | 10/1993 | Rhinehart | 43/44.84 |
| 5,351,434 | A * | 10/1994 | Krenn | 43/44.91 |
| 5,461,821 | A * | 10/1995 | Carter, Jr. | 43/43.12 |
| 5,555,668 | A * | 9/1996 | Brasseur | 43/43.15 |
| 6,247,262 | B1 * | 6/2001 | Wallace | 43/42.74 |
| 7,415,792 | B1 * | 8/2008 | Noble | 43/43.15 |
| 7,621,070 | B2 * | 11/2009 | Brasseur | 43/43.1 |
| 7,832,139 | B1 * | 11/2010 | Christensen | 43/44.83 |
| 2005/0257419 | A1 * | 11/2005 | Weeda | 43/44.87 |
| 2008/0040966 | A1 * | 2/2008 | Stone et al. | 43/43.15 |
| 2010/0083560 | A1 * | 4/2010 | Blackshear, Jr. | 43/43.15 |
| 2010/0175303 | A1 * | 7/2010 | Caison | 43/43.15 |

FOREIGN PATENT DOCUMENTS

| | | | |
|---|---|---|---|
| GB | 2373700 | A * | 10/2002 |
| GB | 2378113 | A * | 2/2003 |
| GB | 2388289 | A * | 11/2003 |
| JP | 11155446 | A * | 6/1999 |

* cited by examiner

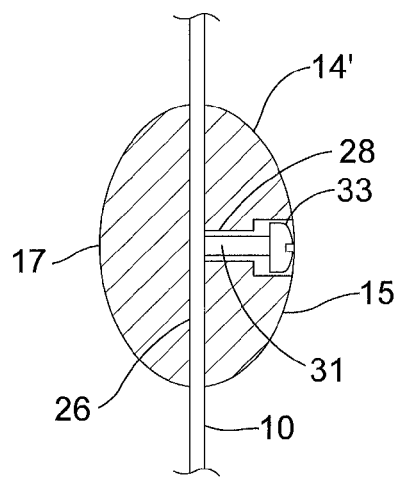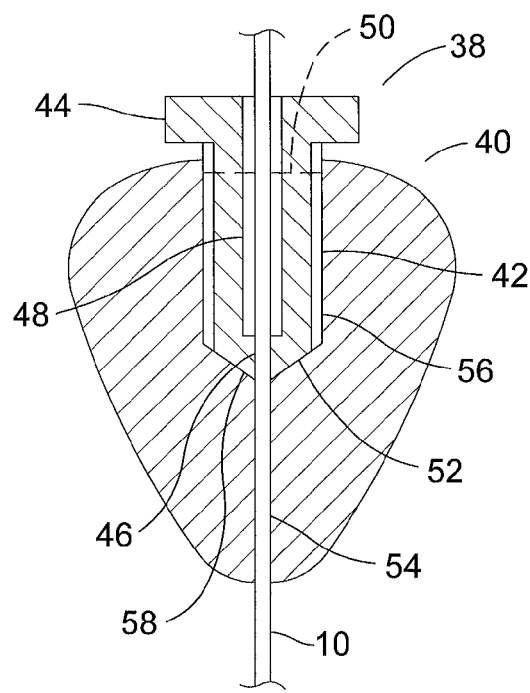
FIG. 4a   FIG. 4b
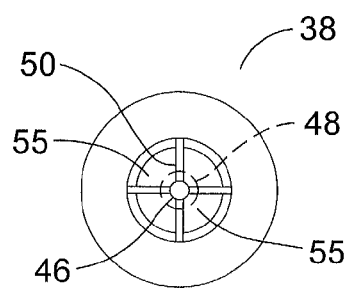
FIG. 4c

BOTTOM BOUNCER WITH ADJUSTABLE WEIGHT

BACKGROUND OF THE INVENTION

1. Field of the Invention

The present invention relates generally to fishing devices and more specifically to a bottom bouncer with adjustable weight, which allows a bottom bouncer to be set to a different distance off a bottom of a body of water.

2. Discussion of the Prior Art

U.S. Pat. No. 4,727,676 to Runyan discloses a fishing device. The Runyan patent includes an elongated resilient wire with a float on one end and sinker on the other. The wire extends through an aperture in the sinker and is releasably held thereto by a bend in the wire which binds in the aperture. U.S. Pat. No. 5,253,447 to Rhinehart discloses a bottom bouncer jig for walleyes. The Rhinehart patent includes a fishing jig having special utility in trolling or drift fishing for bottom feeding fish, which is constructed of a metal wire or rod. The wire or rod is bent so as to form two depending legs of unequal length having a loop formed at the juncture of the legs. One or more sinkers can be placed on the longer leg, before insertion of the leg into an eye.

Accordingly, there is a clearly felt need in the art for a bottom bouncer with adjustable weight, which allows a hook retaining portion of the bottom bouncer to be set to a different distance off a bottom of a body of water by adjusting a position of a weight along a length of a bouncer wire.

SUMMARY OF THE INVENTION

The present invention provides a bottom bouncer with adjustable weight, which allows a hook retaining portion of the bottom bouncer to be set to a different distance off a bottom of a body of water. The bottom bouncer with adjustable weight (bottom bouncer) preferably includes a flexible line, a float and at least one weight. The flexible line may be a wire, cable or any other suitable object. A loop is formed on one end of the flexible line for attachment of a swivel connection, a fishing line or the like. The float preferably includes a lengthwise through hole for receiving the flexible line. The float is preferably retained on the one end of the flexible line by securing the float to the flexible line with any suitable method, such as water resistant adhesive.

The weight preferably includes a lengthwise through hole for receiving the flexible line. A threaded hole is preferably formed through the weight substantially perpendicular to the lengthwise through hole. A fastener or the like is threaded into the threaded tap. The fastener is tightened against the flexible line to secure the weight along a length thereof, such that a hook will be a set distance off the bottom of a body of water. The fastener may be replaced with a chuck screw. The chuck screw includes an axial bore for receiving the flexible line. The chuck screw includes at least three clamp fingers that clamp on the flexible line, when the chuck screw is threaded into a threaded tap formed concentric with the lengthwise through hole. However, the weight may be fabricated with only a lengthwise through hole. A clamp collar with a set screw may be used to positioned the at least one weight along a length of the flexible line. However, any other type of fastenable weight may be used such as a split shot.

Accordingly, it is an object of the present invention to provide a bottom bouncer, which allows a hook retaining portion of the bottom bouncer to be set to a different distance off a bottom of a body of water by adjusting a position of at least one weight along a length of a flexible line.

These and additional objects, advantages, features and benefits of the present invention will become apparent from the following specification.

BRIEF DESCRIPTION OF THE DRAWINGS

FIG. 4a is an enlarged cross sectional view of a weight of a bottom bouncer with a fastener having a head in accordance with the present invention.

FIG. 4b is an enlarged cross sectional view of a weight of a bottom bouncer with a chuck screw having a head in accordance with the present invention.

FIG. 4c is an end view of a chuck screw of a bottom bouncer in accordance with the present invention.

DETAILED DESCRIPTION OF THE PREFERRED EMBODIMENTS

Figure 1:
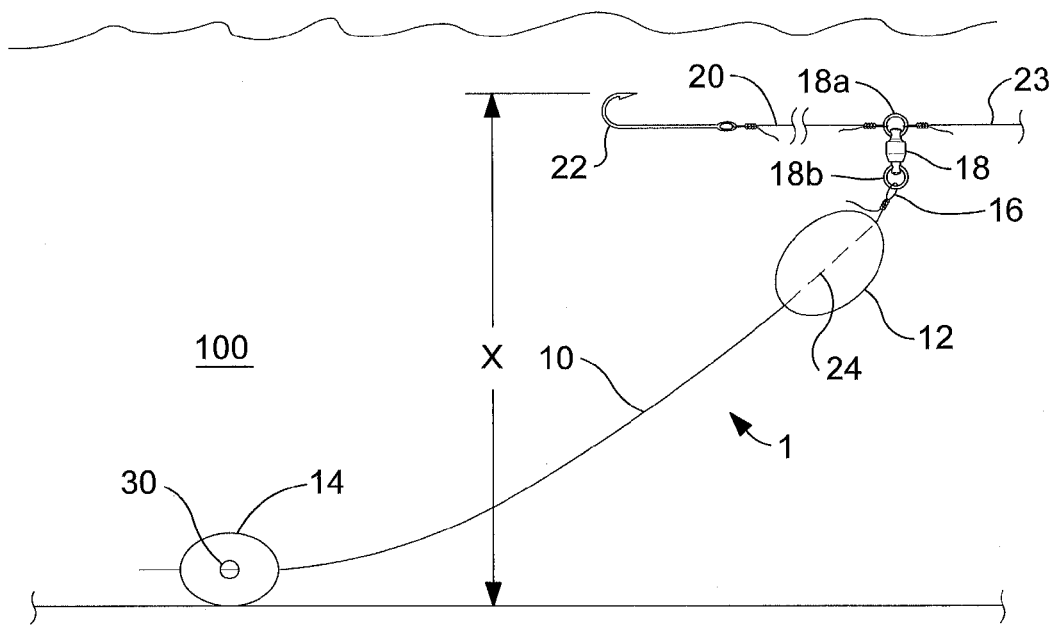
FIG. 1 is a side view of a bottom bouncer with an adjustable weight secured adjacent an end of a flexible line in accordance with the present invention.

With reference now to the drawings, and particularly to FIG. 1, there is shown a side view of a bottom bouncer 1. The bottom bouncer 1 preferably includes a flexible line 10, a float 12 and at least one weight 14. The flexible line 10 is fabricated from wire, cable or any other suitable object. A loop 16 is formed on one end of the flexible line 10 for attachment of a swivel connection 18; a leader line 20 with a hook 22; a fishing line (not shown) with the hook 22 or the like. A fishing line 23 from a fishing rod and reel (not shown) is also attached to the swivel connection 18. The swivel connection 18 has a first eyelet 18a at a first upper end to which the leader line 20 and fishing line 23 are connected and a second eyelet 18b at a second lower end to which the loop 16 formed on the one end of the flexible line 10. The float 12 preferably includes a lengthwise through hole 24 for receiving the flexible line 10. The float 12 is fabricated from any suitable buoyant material. The float 12 is preferably retained on the one end of the flexible line 10 by securing the float 12 thereto with any suitable method, such as water resistant adhesive.

Figure 4:
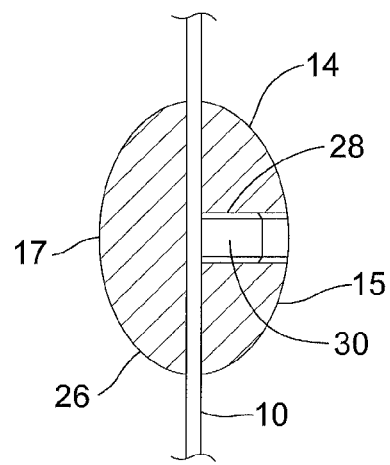
FIG. 4 is an enlarged cross sectional view of a weight of a bottom bouncer in accordance with the present invention.

With reference to FIG. 4, the weight 14 includes a dense body 15. The dense body 15 has a mass that is greater than the mass of water, such that the weight 14 sinks to a bottom of water. A lengthwise through hole 26 is formed through the dense body 15 for receiving the flexible line 10. A threaded hole 28 is formed through the weight 14 to the lengthwise through hole 26 and substantially perpendicular to the lengthwise through hole 26. A set screw 30, a fastener or the like is threaded into the threaded hole 28. It is preferably to round an end of the set screw 30 that contacts the flexible line 10 to prevent damage thereto. The set screw 30 may include a coating applied to the threads, such as Nylok or the like to prevent the set screw from loosening during use.

With reference to FIG. 4a, the threaded hole 28 is formed through the weight 14' to the lengthwise through hole 26 and substantially perpendicular to the lengthwise through hole 26. A counterbore 33 is formed concentric with the threaded hole 28 to receive a head of a threaded fastener 31. The counterbore 33 only allows the fastener 31 to be threaded into the threaded hole 28 a set distance and thus prevent damage to the flexible line 10. It is preferably that the counterbore 33 be deep enough, such that a head of the threaded fastener 31 is positioned below an outside surface 17 of the weight 14' to prevent snagging on growth in the body of water 100. It is also preferably to round an end of the threaded fastener 31 that contacts the flexible line 10 to prevent damage thereto.

The set screw 30 or the threaded fastener 31 is tightened against the flexible line 10 to secure the weight 14 thereto, such that the hook 22 will be a set distance X off the bottom of a body of water 100.

With reference to FIGS. 4b-4c, the set screw 30 or the threaded fastener 31 may be replaced with a chuck screw 38. The chuck screw 38 is threaded into a weight 40. The chuck screw 38 includes a threaded shaft 42 that extends from a knob portion 44. An axial bore 46 is formed through a length of the chuck screw 38 for firmly receiving the flexible line 10. A counterbore 48 is formed through substantially a length of the chuck screw 38. At least three slits 50 are formed through substantially a length of the chuck screw 38 to form at least three clamp fingers 55. A compression chamfer 52 is formed on an end of the threaded shaft 42.

The weight 40 includes a line bore 54 and a threaded tap 56. The line bore 54 is formed through a length of the weight 40. The threaded tap 56 is formed to substantially a middle of the weight concentric with the line bore 54. A bottom of the threaded tap 56 is terminated with a countersink 58, which is sized to receive the compression chamfer 52. The flexible line 10 is inserted through the counterbore 48, the axial bore 46 and the line bore 54. for firmly receiving the flexible line 10. Threading the threaded shaft into the threaded tap 56 forces the compression chamfer 52 to contact the countersink 58, which causes the at least three clamp fingers 55 move inward toward each other and decrease a diameter of the axial bore 46. The decreased diameter of the axial bore 46 clamps around the flexible line 10.

Figure 2:
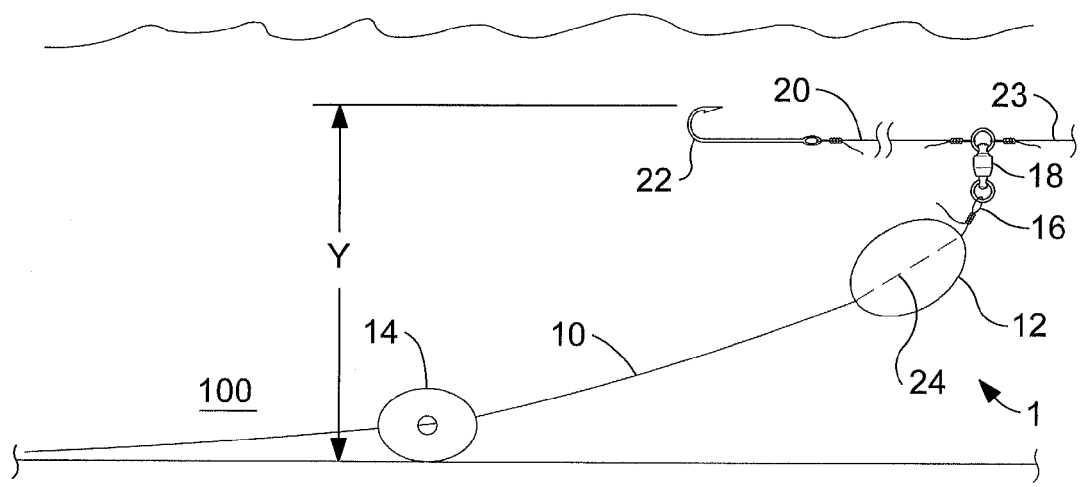
FIG. 2 is a side view of a bottom bouncer with an adjustable weight secured at substantially a middle of a flexible line in accordance with the present invention.

The removability of the weight 14 allows different masses of weights to be quickly removed and secured to the flexible line 10. The weight 14 may also be used on a fishing line cast from a fishing rod and reel without the benefit of the bottom bouncer 1, 1'. With reference to FIG. 2, sliding the weight 14 to substantially a middle of the flexible line 10 results in a distance Y between the body of water 100 and the hook 22 being reduced, such that X>Y.

However, any other type of fastenable weight may be used such as a split shot. A split shot includes a split for retention of a flexible line 10 or the like. An outside perimeter of the split shot is squeezed and the flexible line 10 is retained in the split shot. Split shots are well known in the art and do not need to be described in further detail.

Figure 3:
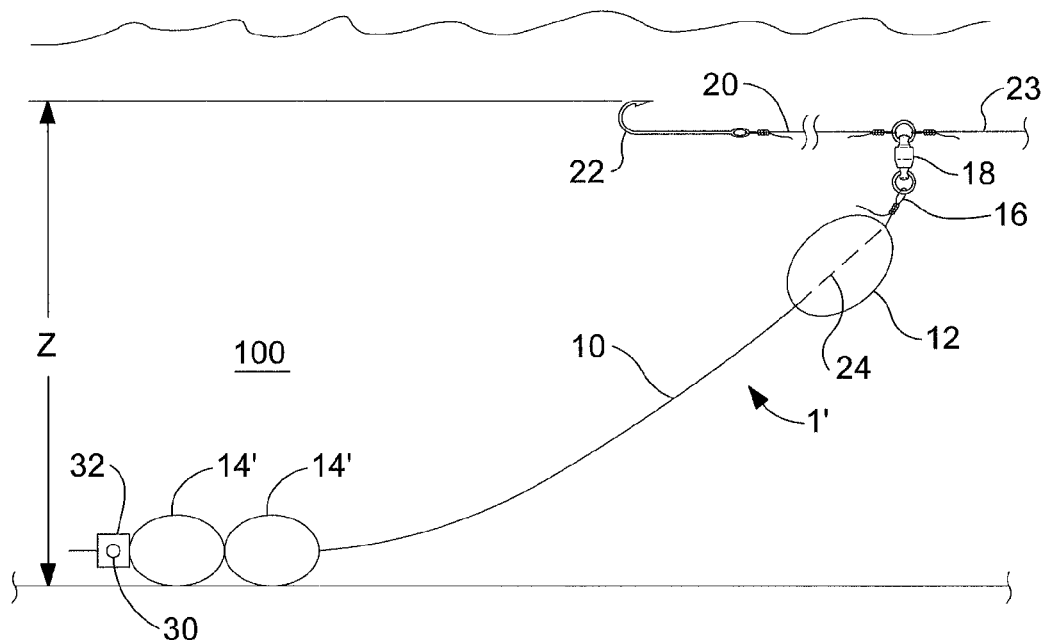
FIG. 3 is a side view of a bottom bouncer having two weights positioned at an end of a flexible line with a clamp collar in accordance with the present invention.
Figure 5:
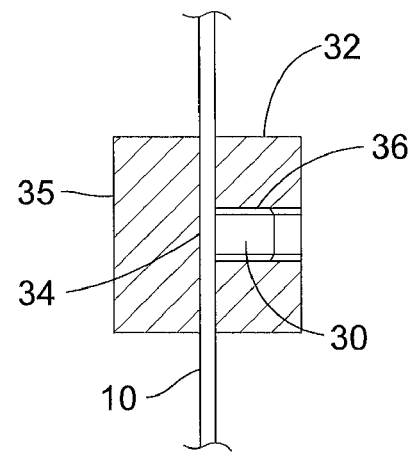
FIG. 5 is an enlarged cross sectional view of a clamp collar of a bottom bouncer in accordance with the present invention.

With reference to FIG. 3, a bottom bouncer 1' includes the flexible line 10, the float 12 and two weights 14'. Each weight 14' is fabricated with the lengthwise through hole 26, but without the threaded hole 28. With reference to FIG. 5, a clamp collar 32 includes a lengthwise through hole 34 and threaded hole 36. The threaded hole 36 is formed through the clamp collar 32 to the lengthwise through hole 34, substantially perpendicular to the lengthwise through hole 34. The set screw 30 is tightened against the flexible line 10 to secure the two weights 14' thereto. It is preferably that an end of the set screw 30 be positioned below an outside surface 35 of the clamp collar 32 to prevent snagging on growth in the body of water 100. The clamp collar 32 is slid along a length of the flexible line 10 to adjust a distance Z from a bottom of the body of water 100 to the hook 22. The mass of the two weights 14' relative to the mass of the body of water 100 will cause the weights 14' to slide down the flexible line 10, against the clamp collar 32.

Figure 6:
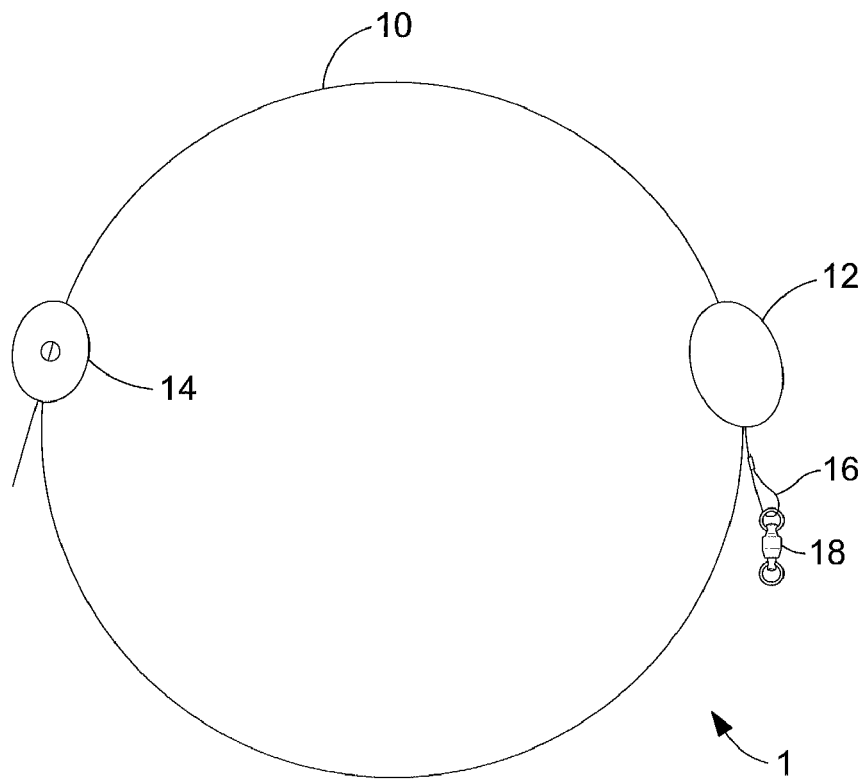
FIG. 6 is a side view of a bottom bouncer rolled into a loop for compact storage in accordance with the present invention.

With reference to FIG. 6, the bottom bouncer 1 is rolled into a loop for compact storage. The bottom bouncer 1' may also be rolled into a loop for compact storage.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A bottom bouncer comprising:
   a flexible line having a loop formed on one end;
   a leader line having a first end and second end;
   a fishing hook attached to a second end of said leader line;
   a fishing line having a first end and a second end;
   a swivel having a first eyelet at a first end thereof and a second eyelet at a second end thereof, said first ends of said leader line and said fishing line are both secured to said first eyelet at said first end of said swivel, and said loop is secured to said second eyelet at said second end of said swivel;
   a float is fabricated from a buoyant material, said float is retained at said one end of said flexible line; and
   at least one weight having a longitudinal axis, each one of said at least one weight includes a through hole extending generally parallel to said longitudinal axis of said at least one weight and which receives said flexible line, each one of said at least one weight having a threaded hole that extends perpendicular to said through hole and communicates therewith, each one of said at least one weight having a counterbore that is concentric with said threaded hole and extends between said threaded hole and an outer surface of said at least one weight, each one of said at least one weight having a fastener extending inside said counterbore and threaded into said threaded hole and contacting said flexible line for axially securing said at least one weight along a length of said flexible line, said fastener is located below said outer surface of said at least one weight when in contact with said flexible line.

2. The bottom bouncer of claim 1 wherein:
   said flexible line is fabricated from one of a wire and a cable.

* * * * *